US012712717B2

(12) United States Patent
La Gatta

(10) Patent No.: US 12,712,717 B2
(45) Date of Patent: Aug. 18, 2026

(54) METHODS AND SYSTEMS FOR PERFORMING SECURE TRANSACTIONS

(71) Applicant: PERISO ShPK, Durrës (AL)

(72) Inventor: Antonio La Gatta, Gandria (CH)

(73) Assignee: PERISO ShPK, Durrës (AL)

( * ) Notice: Subject to any disclaimer, the term of this patent is extended or adjusted under 35 U.S.C. 154(b) by 38 days.

(21) Appl. No.: 18/856,660

(22) PCT Filed: Apr. 14, 2023

(86) PCT No.: PCT/EP2023/059765
§ 371 (c)(1),
(2) Date: Oct. 14, 2024

(87) PCT Pub. No.: WO2023/198877
PCT Pub. Date: Oct. 19, 2023

(65) Prior Publication Data

US 2025/0233736 A1 Jul. 17, 2025

Related U.S. Application Data

(60) Provisional application No. 63/331,319, filed on Apr. 15, 2022.

(51) Int. Cl.
*H04L 9/08* (2006.01)
*G06Q 20/40* (2012.01)
*H04L 9/06* (2006.01)

(52) U.S. Cl.
CPC ......... *H04L 9/0852* (2013.01); *G06Q 20/401* (2013.01); *H04L 9/0618* (2013.01); *H04L 9/0869* (2013.01)

(58) Field of Classification Search
CPC ... H04L 9/0852; H04L 9/0618; H04L 9/0869; H04L 9/0827; H04L 2209/56; H04L 9/0662; H04L 9/0897; G06Q 20/401
See application file for complete search history.

(56) References Cited

U.S. PATENT DOCUMENTS 10,097,351 B1 * 10/2018 Kelly .................... H04L 9/3093
11,310,040 B2 * 4/2022 Menon .................. H04L 9/0852
(Continued)

FOREIGN PATENT DOCUMENTS

EP 1833009 A1 * 9/2007 ......... G06Q 20/3823
EP 4068677 A1 * 10/2022 ........... H04L 9/0858
(Continued)

OTHER PUBLICATIONS

ISA/EP, International Search Report and Written Opinion for corresponding PCT Patent Application No. PCT/EP2023/059765, mailed Jul. 4, 2023, 12 pages.

(Continued)

*Primary Examiner* — Javier O Guzman
(74) *Attorney, Agent, or Firm* — NK Patent Law

(57) ABSTRACT

A system includes a remote quantum terminal configured for generating random numbers, storing the random numbers, and transmitting the random numbers to a local quantum terminal via a quantum channel that uses a perfect cipher or a quasi-perfect cipher and a quantum key distribution (QKD) protocol for encoding the random numbers as quantum information. A local quantum terminal is configured for receiving the quantum information from the remote quantum terminal via the quantum channel, determining the random numbers based on the quantum information received from the remote quantum terminal, and transmitting the random numbers to a secure smart card via a non-quantum channel. A secure smart card is configured for receiving the random numbers from the local quantum terminal via the non-quantum channel, storing the random numbers, and performing a secure transaction between the secure smart card and the remote quantum terminal.

28 Claims, 3 Drawing Sheets

(56) References Cited

U.S. PATENT DOCUMENTS

| | | | | |
|---|---|---|---|---|
| 11,329,811 | B1 * | 5/2022 | Russell | H04L 9/0866 |
| 11,736,281 | B1 * | 8/2023 | Maganti | G06F 16/2219 713/150 |
| 11,930,105 | B1 * | 3/2024 | Stapleton | H04L 9/0877 |
| 2005/0063547 | A1 * | 3/2005 | Berzanskis | H04L 9/0852 380/278 |
| 2007/0130455 | A1 * | 6/2007 | Elliott | H04L 9/0858 713/150 |
| 2016/0359626 | A1 * | 12/2016 | Fu | H04L 9/0858 |
| 2021/0160062 | A1 * | 5/2021 | Sembhi | H04L 67/104 |
| 2021/0176278 | A1 * | 6/2021 | Rahman | H04W 12/043 |
| 2021/0306146 | A1 * | 9/2021 | Chen | H04L 9/0869 |
| 2022/0006627 | A1 * | 1/2022 | Ko | H04L 9/0852 |
| 2023/0070408 | A1 * | 3/2023 | Jeong | H04L 9/0852 |
| 2024/0333398 | A1 * | 10/2024 | Bush | H04B 10/70 |

FOREIGN PATENT DOCUMENTS

| | | | | |
|---|---|---|---|---|
| EP | 4109811 | A1 * | 12/2022 | H04L 9/0869 |
| EP | 4604448 | A1 * | 8/2025 | H04L 9/0858 |
| GB | 2427336 | A * | 12/2006 | H04L 9/0858 |
| GB | 2616406 | A * | 9/2023 | H04L 9/3247 |

OTHER PUBLICATIONS

Christopher Portmann et al.: “Security in Quantum Cryptography”, arxiv.org, Cornell University Library, 201 Olin Library Cornell University Ithaca, NY 14853, Jan. 29, 2021 (Jan. 29, 2021), XP081870975, 60 pages.

WIPO, International Preliminary Report on Patentability for corresponding PCT Patent Application No. PCT/EP2023/059765, issued Oct. 8, 2024, 9 pages.

* cited by examiner

METHODS AND SYSTEMS FOR PERFORMING SECURE TRANSACTIONS

CROSS-REFERENCE TO RELATED APPLICATIONS

This application is a U.S. National Phase Application of International Patent Application No. PCT/EP2023/059765 filed on Apr. 14, 2023, entitled "METHODS AND SYSTEMS FOR PERFORMING SECURE TRANSACTIONS", which claims priority to U.S. Provisional Patent Application No. 63/331,319 filed on Apr. 15, 2022, entitled "METHODS AND SYSTEMS FOR PERFORMING SECURE TRANSACTIONS", the content of all of which is incorporated by reference herein.

BACKGROUND

Field of the Invention

The present invention relates to methods and systems for performing secure transactions, and more specifically, to entropy-based payment methods and systems that are secure against quantum computing techniques.

Description of Related Art

Quantum computers are machines that use the properties of quantum physics to store data and perform computations. For example, a quantum computer can calculate using qubits, which can be in a coherent superposition of two states simultaneously, thus representing 0 and 1 at the same time. This contrasts with classical computers which calculate using transistors which represent either 0 or 1.

The computing power of a quantum computer for certain tasks is significantly greater than that of a classical computer. For example, the computing power of a 30-qubit quantum computer is approximately equal to the computing power of a classical computer capable of 10 teraflops (10 trillion floating-point operations per second). Typical desktop computers operate at speeds measured in gigaflops (billions of floating-point operations per second).

The significantly greater computing power of quantum computers makes transactions based on classical encryption techniques, such as public/private key encryption methods, increasingly vulnerable to brute-force or other attacks. As a result, payment methods based on these encryption techniques are increasingly insecure to being hacked by a quantum computer.

While quantum computers, quantum communications devices, and quantum communications channels may be used instead of classical computers to protect against these vulnerabilities, quantum devices are often impractical and expensive to deploy and operate.

Accordingly, a need exists for improved methods and systems for performing secure transactions, such as payment transactions, that are secure against quantum computing techniques.

BRIEF SUMMARY

According to one embodiment of the present invention, a system for entropy-based payment is disclosed. The system includes a remote quantum terminal configured for generating random numbers, storing the random numbers, and transmitting the random numbers to a local quantum terminal via a quantum channel that uses a perfect cipher or a quasi-perfect cipher and a quantum key distribution (QKD) protocol for encoding the random numbers as quantum information. A local quantum terminal is configured for receiving the quantum information from the remote quantum terminal via the quantum channel, determining the random numbers based on the quantum information received from the remote quantum terminal, and transmitting the random numbers to a secure smart card via a non-quantum channel. A secure smart card is configured for receiving the random numbers from the local quantum terminal via the non-quantum channel, storing the random numbers, and performing a secure transaction between the secure smart card and the remote quantum terminal using at least a portion of the random numbers stored at the secure smart card and at least a portion of the random numbers stored at the remote quantum terminal, where the at least a portion of the random numbers is used as an encryption key for encrypting the transaction.

DETAILED DESCRIPTION

Figure 1:
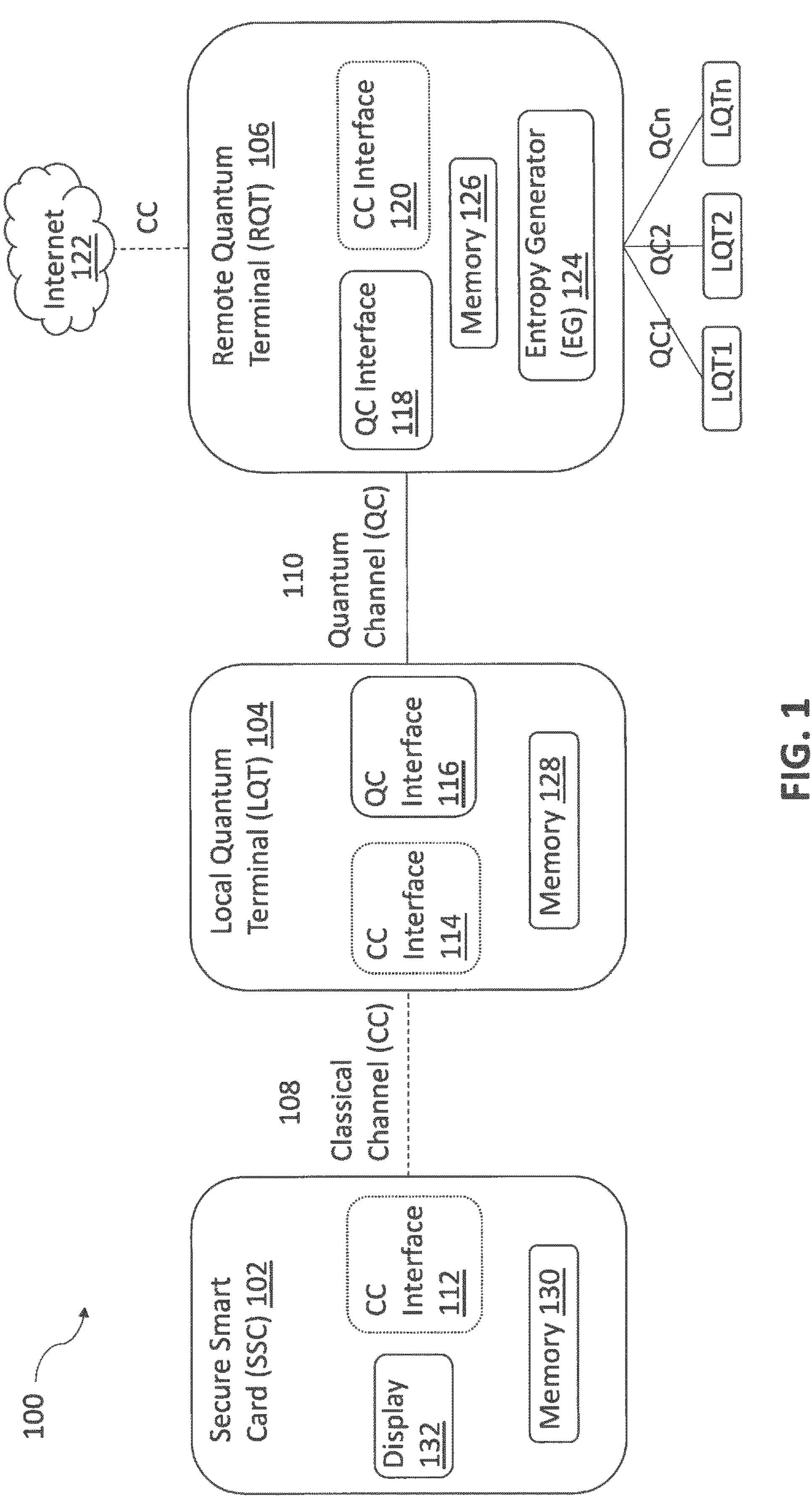
FIG. 1 is block diagram illustrating an exemplary system for entropy-based payment according to an embodiment of the subject matter described herein.

The subject matter described herein includes methods and systems for entropy-based payment. According to one embodiment of the present invention, a system for entropy-based payment is disclosed. The system includes a remote quantum terminal configured for generating random numbers, storing the random numbers, and transmitting the random numbers to a local quantum terminal via a quantum channel that uses a perfect cipher or a quasi-perfect cipher and a quantum key distribution (QKD) protocol for encoding the random numbers as quantum information. A local quantum terminal is configured for receiving the quantum information from the remote quantum terminal via the quantum channel, determining the random numbers based on the quantum information received from the remote quantum terminal, and transmitting the random numbers to a secure smart card via a non-quantum channel. A secure smart card is configured for receiving the random numbers from the local quantum terminal via the non-quantum channel, storing the random numbers, and performing a secure transaction between the secure smart card and the remote quantum terminal using at least a portion of the random numbers stored at the secure smart card and at least a portion of the random numbers stored at the remote quantum terminal, where the at least a portion of the random numbers is used as an encryption key for encrypting the transaction.

As discussed above, the computing power of quantum computers makes transactions based on classical encryption techniques vulnerable to brute-force or other attacks. The present invention secures transactions against quantum computer computational power while allowing a user to securely communicate with a remote sever over a non-secure, classical communications channel even when a quantum communications channel is not available. The subject matter described herein for generating, storing, and using entropy in order to, for example, perform secure transactions or exchange secure message content can be divided into two stages. First, a secure smart card can be loaded with entropy. This can include receiving a long sequence of random numbers generated at a remote server, such as a remote quantum terminal, and storing the sequence of random numbers in a memory of the secure smart card. The user may carry the secure smart card, now loaded with entropy, for later use. At this point, the same random number sequence is stored both at the server and on the secure smart card. Once the secure smart card contains the random number sequence (entropy), the secure smart card may use at least a portion of the random number sequence to perform secure transactions over a non-quantum channel. For example, when a user wishes to perform a payment transaction, the secure smart card may determine an encryption key k from the random number sequence such that the size of k is equal to or greater than the information to be encrypted using k. For example, a message containing "Hello" may include five characters and be encrypted with an encryption key k that is at least five characters.

FIG. 1 is block diagram illustrating an exemplary system for entropy-based payment according to an embodiment of the subject matter described herein. In FIG. 1, the example system 100 includes a secure smart card (SSC) 102, a local quantum terminal (LQT) 104, and a remote quantum terminal (RQT) 106.

A smart card is a portable terminal device, typically approximately the size of portable credit card, that includes a microprocessor, memory, and associated circuitry and computer-executable instructions for implementing a communication protocol such as the near field communication (NFC) protocol. A secure smart card (SSC), as referred to herein, is a smart card that includes modifications or additions to the microprocessor, memory, associated circuitry, and computer-executable instructions for implementing the functionality disclosed herein. For example, the memory of an SSC may be larger than that of a conventional smart card in order to store long random number sequences (received entropy used as encryption/decryption keys). The processor of an SSC may be further configured to perform encryption and/or decryption algorithms. An SSC may also include a display and input/output (physical or virtual keyboard) not normally included on conventional smart cards. In another embodiment, the SSC is implemented using a portable terminal, such as a smartphone or mobile device, rather than using a separate smart card.

A quantum terminal is a communications device that can communicate quantum information over a quantum channel. As will be discussed in greater detail below, quantum information can include, for example, information using binary quantum states, or qubits. A quantum channel includes a transmission medium and associated quantum key distribution protocols that enable the information encoded using binary quantum states to be transmitted securely. For example, a sender quantum terminal may send a sequence of pulses (e.g., femtosecond pulses with 80 MHz rep. rate) to a receiving quantum terminal over a quantum channel, each pulse containing a single photon polarized differently.

A local quantum terminal is a quantum terminal that includes both quantum channel communications capabilities and classical channel communications capabilities. Classical communications capabilities include any kind of standard wired or wireless technology necessary to communicate with a secure smart card. For example, communication may use NFC, Wi-Fi, or 4G/5G mobile communication protocols. It is appreciated that while a local quantum terminal is currently not portable or mobile due to the constraints of communicating over a quantum channel, the local quantum terminal is not limited to non-portable or non-mobile embodiments. In one embodiment, the local quantum terminal may be, or may be integrated with, an automatic teller machine (ATM) or point-of-sale (POS) terminal. The local quantum terminal is a quantum terminal that is local relative to a secure smart card. For example, for a secure smart card to communicate with a local quantum terminal over NFC, the secure smart card and the local quantum terminal must be proximate to each other (e.g., NFC range is approximately 20 cm).

A remote quantum terminal, on the other hand, is remotely located from both the local quantum terminal and the secure smart card. Like the local quantum terminal, a remote quantum terminal includes both quantum channel communications capabilities and classical channel communications capabilities. The remote quantum terminal is also typically not a mobile or portable device. Unlike each local quantum terminal (e.g., LQT1-LQTn), which communicates with one remote quantum terminal, a remote quantum terminal can communicate with multiple local quantum terminals. In this way, the remote quantum terminal acts as a center of star of a network that hosts a plurality of local quantum terminals where the remote quantum terminal is connected to many quantum terminals using corresponding quantum channels (e.g., QC1-QCn).

It may be appreciated that the system described herein may include devices (smart card 102, local quantum terminal 104, and remote quantum terminal 106) connected by multiple, different communication channels—classical channel 108 and quantum channel 110. The quantum channel 110 is a channel through which quantum states of light encoded with random bits are transmitted between devices. The quantum channel 110 is a conduit that facilitates the transport of light between the nodes. It may, for example, be an optical dark fibre link or a free-space connection. The classical channel 108 is a conventional communication channel, for example, as might be found in an Ethernet based local area network, a Wi-Fi link, a FibreChannel link, or similar communications channel. Data communicated over the classical channel 108 may be protected by a Message Authentication Code (MAC) to authenticate the identities of the device communicating over the channel.

SSC 102 may communicate with LQT 104 via a classical communications channel (CC) 108. A communication channel refers to a physical transmission medium (e.g., a metal wire, fiber optic cable, or air) or to a logical connection over a multiplexed medium, such as a radio channel in telecommunications and computer networking. A channel is used to convey an information signal (e.g., message, byte stream, photons) between senders and receivers. CC 108 may include any wired or wireless communications link that is not a quantum channel (i.e., does not communicate quantum information). For example, CC 108 may be a twisted-pair ethernet cable, coaxial cable, or glass fiber-optic cable. CC 108 may also be a wireless connection such as a near field communications (NFC) protocol connection, a Wi-Fi connection, or a cellular (e.g., 4G or 5G) mobile connection.

SSC 102 may include a CC interface 112 for sending and receiving information via CC 108. For example, CC interface 11 may be an ethernet adapter allowing SSC 102 to communicate with LQT 104 via a twisted pair ethernet cable. Alternatively, CC interface 112 may be an NFC radio allowing SSC 102 to communicate with LQT 104 over the air. It is appreciated CC 112 may include any suitable classical communications device for communicating with corresponding CC interface 114 on LQT 104.

LQT 104 may include both CC interface 114 for communicating with SSC 102 via CC 108 and a quantum channel (QC) interface 116 for communicating with RQT 106 via quantum channel 110.

A quantum channel, such as QC 110, is a communication channel that can transmit quantum information. A quantum channel can also transmit classical information. Quantum information is information of the state of a quantum system. Thus, quantum communication involves processing information using binary quantum states, or qubits, instead of classical communication's use of binary digits, or bits. In classical computing, a bit, typically characterized as 0 or 1, is used to represent information. In quantum computing, a qubit is used to represent quantum information. For example, information can be encoded using qubits by imparting spin to an electron in which the two state are spin up and spin down. In another example, quantum information can be encoded using the polarization of a single photon in which the two states are vertical polarization and horizontal polarization. In a classical system, a bit would have to be in one state or the other. However, quantum mechanics allows the qubit to be in a coherent superposition of both states simultaneously, a property that is fundamental to quantum mechanics and quantum computing.

As used herein, a quantum channel also refers to a communication channel that uses perfect cipher (PC) or a quasi-perfect cipher (QPC) over a quantum key distribution (QKD) protocol for communicating quantum information (also referred to as "entropy) between, for example, LQT 104 and RQT 106. In contrast to conventional public key cryptography, which relies on the computational difficulty of certain mathematical functions and is susceptible to quantum computing techniques, the security of encryption that uses quantum key distribution relies on quantum mechanics. Thus, in contrast to a classical channel, communications using a quantum channel are secured by properties of quantum physics. Security of a communications channel refers to confidence that the content of an encrypted message transmitted between a sender and a receiver cannot be copied, or intercepted, and decrypted by any other than the intended recipient. In contrast to classical physics, the act of measuring an unknown quantum state changes that state in some way. Further, quantum entanglement describes that, if an entangled pair of objects is shared between two parties, anyone intercepting either object alters the overall system, revealing the presence of the third party (and the amount of information they have gained). These features of quantum physics can be used to detect eavesdropping of quantum communication.

In one example, the Bennett-Brassard-84 (BB84) QKD protocol provides for secure communication between two parties using a quantum channel. The security of BB84 comes from encoding information in non-orthogonal states, which cannot be measured without disturbing the original state. BB84 uses two pairs of states, with each pair conjugate to the other pair, and the two states within a pair being orthogonal to each other. Pairs of orthogonal states are referred to as a basis. Example polarization state pairs are either the rectilinear basis of vertical (0°) and horizontal (90°) or the diagonal basis of 45° and 135°.

The BB84 protocol may begin with a sender and a receiver connected via a quantum communication channel which allows quantum states to be transmitted. The sender may begin quantum transmission by creating a random bit (0 or 1) and then randomly selecting one of two bases (e.g., rectilinear or diagonal). The sender then prepares a photon polarization state depending both on the bit value and basis (e.g., 0 is encoded in the rectilinear basis as a vertical polarization state, and a 1 is encoded in the diagonal basis as a 135° state). The sender then transmits a single photon in the state specified to the receiver, using the quantum channel. This process is then repeated, with the sender recording the state, basis, and time of each photon sent. As the receiver does not know the basis the photons were encoded in, the receiver selects a basis at random and, for each photon received, the receiver records the time, measurement basis used, and measurement result. After the receiver measures all the photons, the receiver communicates with the sender over a non-quantum channel to compare the basis used to transmit each photon with the basis used to measure each photon. Photon measurements where the sender and the receiver used a different basis are discarded and the remaining bits are used as a shared key. Other example QKD protocols include the Bennett-92 (B92) protocol and the entanglement-based Ekert-91 (E91) protocol.

Returning to QC 110, a cipher is an algorithm for performing encryption and decryption of information. Encoding using a cipher converts an original message, called plaintext, into ciphertext using a key. Decoding converts the ciphertext into the plaintext using a key. It is appreciated that it is possible to encrypt and decrypt a message with key k or to encrypt a message with key k and decrypt it with key k' where k' is different from k.

A perfect cipher is a cipher that can never be broken, even with unlimited time and unlimited computing power. As used herein, a perfect cipher assumes that an attacker (i.e., an unwanted, third-party eavesdropper) only knows the ciphertext c and tries to find plaintext m or key k. A perfect cipher is when the probability that the plaintext is certain m is equal to the probability that the message is m given the knowledge of the ciphertext c. In other words, the knowledge of the ciphertext does not give the attacker any additional information about the message compared with pure guessing.

The following terms: (M, C, K, $E_k$, $D_k$) may be defined where:

M is the set of plain texts, the plaintext

C is the set of encrypted texts, the ciphertext

K is the set of possible keys $E_k$ is the encryption function where $E_k$ is function of k and m and k∈K and m∈M $D_k$ is the decryption function where $D_k$ is function of k and c and k∈K and c∈C The function $E_k$: M->C is injective that is, invertible to the left, and there exists a key k' such that $D_{k'}(E_k(m))=m$ for every ∈M.

Symmetric encryption is when k=k'. Asymmetric encryption is when k and k' are different. In case of symmetric keys, key k is the secret key and k is used by both parties for encrypting and decrypting messages. In case of asymmetric keys, key k is the public key and key k' is the private key.

Assuming that plaintext m and key k and the ciphertext c are three random discrete variables: $X_M$, $X_K$ $X_C$ where is known the distribution of probability.

Assuming $X_M$, $X_K$ $X_C$ independent and every element m∈M and k∈K have probability not zero to be generated. Or, in other words $P(X_M=m)>0$ for every m∈M and $P(X_K=k)>0$ for every k∈K.

It is appreciated that $X_M$ $X_C$ $X_K$ and $X_C$, are not necessarily independent.

A perfect cipher (PC) is perfect when $P(X_M=m|X_C=c)=P(X_M=m)$ for every m∈M and c∈C.

In every perfect Cipher $|K|>|M|$.

In the case of k and m using the same alphabet (same set of symbols), the length of key k is preferably equal or longer than text m because the best level of security is when the key is at least equal to the information. In other embodiments, the length of key k may be less than text m. It is appreciated, however, that encryption with key k shorter than text m becomes progressively less secure as the ratio k:m decreases from 1:1 to 1:2 or 1:10. Key k that is less than, but not significantly less than, the length of the message may be used where a key that is significantly less than the message is a key that is less than 10 percent of the message. Therefore, in one embodiment, a minimum key length of 10 percent relative to the length of the message may be a minimum threshold value for the length of key k.

Assuming $E_k$ injective must be $|C|\geq|M|$. If for absurd $|K|<|M|\leq|C|$, then for every m∈M would exist a $c_m$∈C that cannot generated by m for no one k∈K, or in other words $c_m \notin \{E_k(m)|k\in K\}$ (in fact, $|\{E_k(m)|k\in K\}|\leq|K|$).

A perfect cipher will have:

$P(X_M=m)=P(X_M=m|X_C=c_m)=0$, but $P(X_M=m)>0$ for every m∈M.

A quasi-perfect cipher (QPC) is cipher where $|K|<=|M|$

As discussed above, the computing power of quantum computers makes transactions based on classical encryption techniques, such as public/private key encryption methods where $|K|<|M|$, increasingly vulnerable to brute-force or other attacks. As a result, payment methods based on these classical encryption techniques are increasingly insecure because they can be hacked by quantum computer. For example, a quantum computer can brute force attack a transaction based on Hash functions (e.g., Blockchain) because in these cases $|K|<|M|$.

The present invention secures transactions against quantum computer computational power while maintaining practical considerations such as allowing a user to use a secure mobile smart card (that has been previously loaded with entropy/communicated with a remote quantum terminal via a local quantum terminal and a quantum channel) to securely communicate with a remote sever over a non-secure, classical communications channel even when a quantum communications channel is not available.

The subject matter described herein for generating, storing, and using entropy to, for example, perform secure transactions or exchange secure message content can be divided into two stages. First, a secure smart card can be loaded with entropy. This can include receiving a long sequence of random numbers generated at a remote server, such as a remote quantum terminal, and storing the sequence of random numbers in a memory of the secure smart card. To ensure perfect security for transmitting the random numbers from the remote server to the secure smart card, and intermediate device may be used. For example, a local quantum terminal may communicate directly with a remote quantum terminal and then relay information to the secure smart card.

Because secure communications over a quantum channel requires specialized devices, such quantum communications are typically expensive, non-mobile, and slow. For example, polarized photons may be transmitted via a dedicated fiber optic cable between a remote quantum terminal (e.g., connected to or integrated with a bank server) and a local quantum terminal in the form of a POS or ATM terminal. It may, therefore, be impractical to integrate or implement these specialized quantum devices into a small, portable device such as a smart card or a mobile phone. Instead, portable devices such as smart cards and mobile phones may communicate over non-quantum, or classical, channels such as Wi-Fi, NFC, etc.

The local quantum terminal may, therefore, include both quantum communications capabilities as well as non-quantum communications capabilities. This allows a single local quantum terminal to act as an intermediary between a single remote quantum server and multiple secure smart cards. The local quantum terminal may receive quantum information encoding a random number sequence from a remote quantum terminal, extract or decode the random number sequence, and forward the random number sequence to a secure smart card using the local quantum terminal's non-quantum communications capabilities.

To transmit the random number sequence from the local quantum terminal to a secure smart card, a communications channel may be established between the secure smart card and the local quantum terminal. For example, a user may place their secure smart card within physical proximity of the local quantum terminal for communicating via NFC protocol. While information transmitted via this non-quantum channel may not be as secure as information transmitted via the quantum channel because the non-quantum channel does not use a perfect or quasi-perfect cipher, security may nonetheless be strong due to the physical proximity of the devices and the brief communication period. Using the established non-quantum channel, the secure smart card may receive the random number sequence from the local quantum terminal and store the random number sequence in a memory of the secure smart card.

The non-quantum channel between the secure smart card and the local terminal may then be terminated and the user may carry the secure smart card, now loaded with entropy, for later use. This concludes the exemplary sequence for generating and storing entropy according to an embodiment of the subject matter described herein. It is appreciated that at this point in the exemplary sequence, the same random number sequence is stored at the server and on the secure smart card. Moreover, by using a quantum channel to communicate the random number sequence over a large distance, secrecy of the random number sequence is maintained (i.e., has not been copied, intercepted, or otherwise obtained by a third party). As will be discussed in greater detail below, however, using a non-quantum channel to communicate the random number sequence over a shorter distance allows for more practical devices (secure smart card or mobile phone) to be used for performing transactions that use the random number sequence.

Once the secure smart card contains the random number sequence (entropy) that is also stored at the remote quantum terminal, the secure smart card may use at least a portion of the random number sequence to perform secure transactions over a non-quantum channel. For example, when a user wishes to perform a payment transaction at a point-of-sale terminal, an amount of information to be encrypted may be determined. The secure smart card may then determine an encryption key k from the random number sequence such that the size of k is equal to or greater than the information to be encrypted using k. Typically, this results in an encryption key k that is longer than a conventional encryption key.

To keep the amount of data transmitted to a minimum, and therefore efficiently use the entropy stored on the smart card for as many transactions as possible before needing to be reloaded, portions of transactions or messages requiring encryption may be encrypted. For example, a message containing "Hello my social security number is 123-45-6789" may encrypt the portion containing "123-45-6789" using key k. This can reduce the length of key k from approximately 38 characters to 9 (approximately 29 characters in "Hello my social security number is" may be unencrypted or encrypted using an encryption key other than key k).

Figure 2:
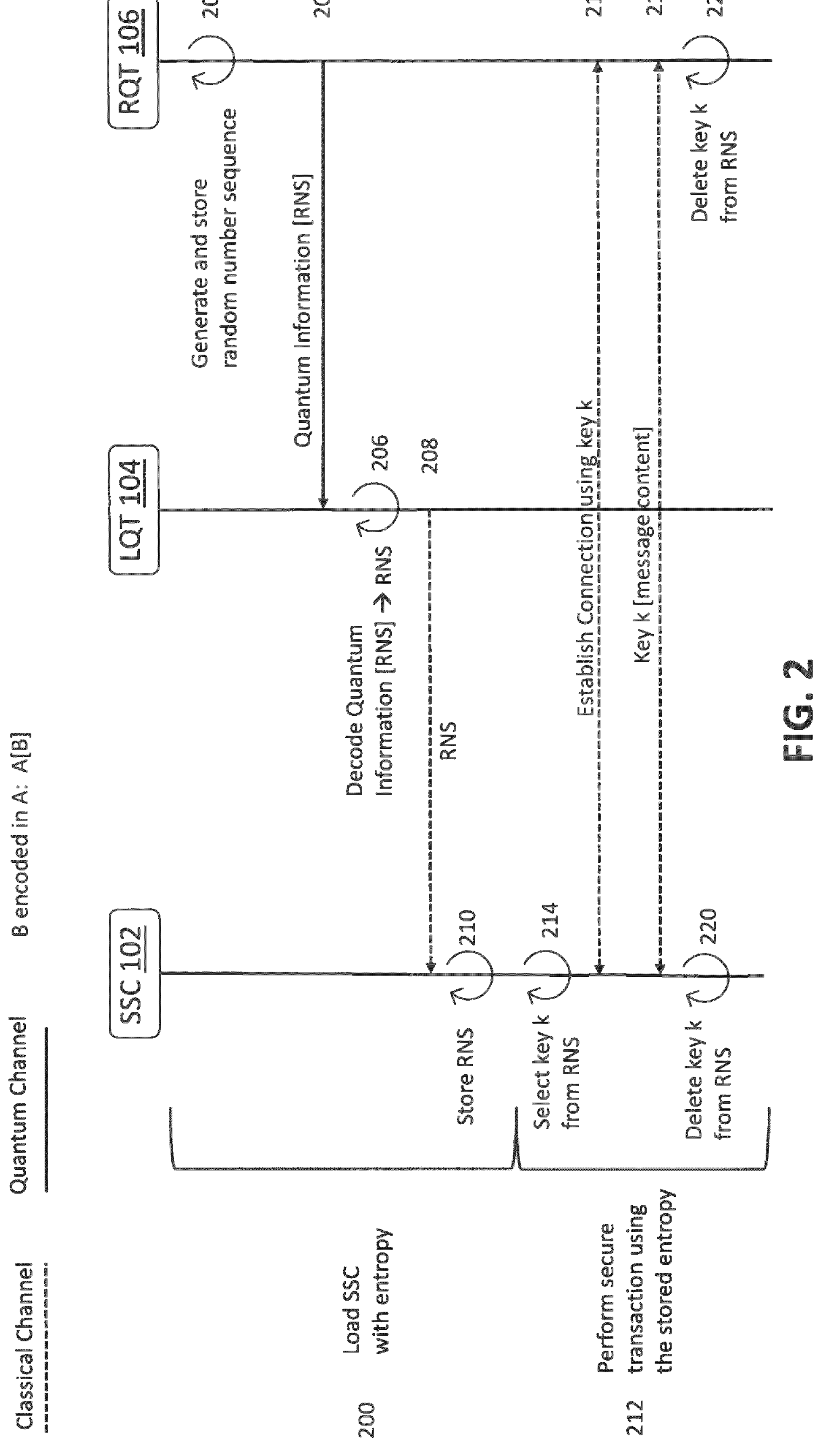
FIG. 2 is a message sequence diagram illustrating an exemplary process for loading a secure smart card with entropy, which is also stored at a remote server, and using the stored entropy to perform a secure transaction according to an embodiment of the matter described herein.

FIG. 2 is a message sequence diagram illustrating an exemplary process for loading a secure smart card with entropy, which is also stored at a remote server, and using the stored entropy to perform a secure transaction according to an embodiment of the matter described herein. FIG. 2 is divided into a first set of steps 200 for loading a secure smart card with entropy and a second set of steps 212 for performing a secure transaction using the stored entropy. It is appreciated that sets of steps 200 and 212 may occur as part of the same transaction or may occur separately at different times and/or locations. Steps 200 begins at step 202 when RQT 106 generates a random number sequence. The random number sequence may be based on a quantum physical process. Alternatively, the random number sequence may be generated using a QKD protocol. In yet other embodiments, the random numbers can be generated using conventional, algorithmic, pseudo-random number generators. Once the random numbers are generated, they may be stored in a memory associated with RQT 106.

Random numbers may be generated starting from a physical phenomenon, such as photons random emission or beta decay or thermal effects. Quantum physical phenomena can produce a high-quality source of entropy that cannot be substituted with any kind of algorithm. An entropy generator (EG) is a physical generator of entropy that provides the random numbers stored in the memory of the secure smart card and the remote quantum terminal (sequence SQ1). Quantum key distribution protocols may need sources of random number to work properly (typically three generators but depends on the QKD protocol). To reduce the cost of a random number generator, SQ1 can also be supplied by a QKD protocol where the function of the entropy generator (RNG) is substituted by a key distributed by the QKD protocol.

At step 204, the random number sequence is encoded as quantum information and transmitted to LQT 104. For example, a sequence of pulses may be transmitted to LQT 104 over a quantum channel, where each pulse contains a single photon polarized differently. At step 206, LQT 104 receives and decodes this quantum information to determine the random number sequence encoded therein. At step 208, LQT 104 transmits the random number sequence to SSC 102 over a non-quantum channel. For example, an NFC connection may be established between SSC 102 and LQT 104. At step 210, the random number sequence is received and stored at SSC 102.

Steps 212 (performing a secure transaction using the stored entropy) begins at step 214 when SSC 102 selects an encryption key k from the stored random number sequence. It is appreciated that encryption key k may include the entire stored random number sequence or a portion of the stored random number sequence. Once encryption key k is determined, a connection may be established using the encryption key k at step 216. This may include transmitting the key to RQT 106 for verification. RQT 106 may compare the key revived from SSC 102 while establishing this connection with the key previously stored at step 202. If the keys match, the connection may be secured.

At step 218, the encryption key k may be used to encrypt communications between SSC 102 and RQT 106. These communications may be associated with, for example, a payment transaction. Once the key k has been used to perform the transaction, the key k (which may represent a portion of the entire random number sequence available) may be deleted from both SSC 102 and RQT 106. The remaining amount of entropy stored on SSC 102 may be displayed to the user.

Figure 3:
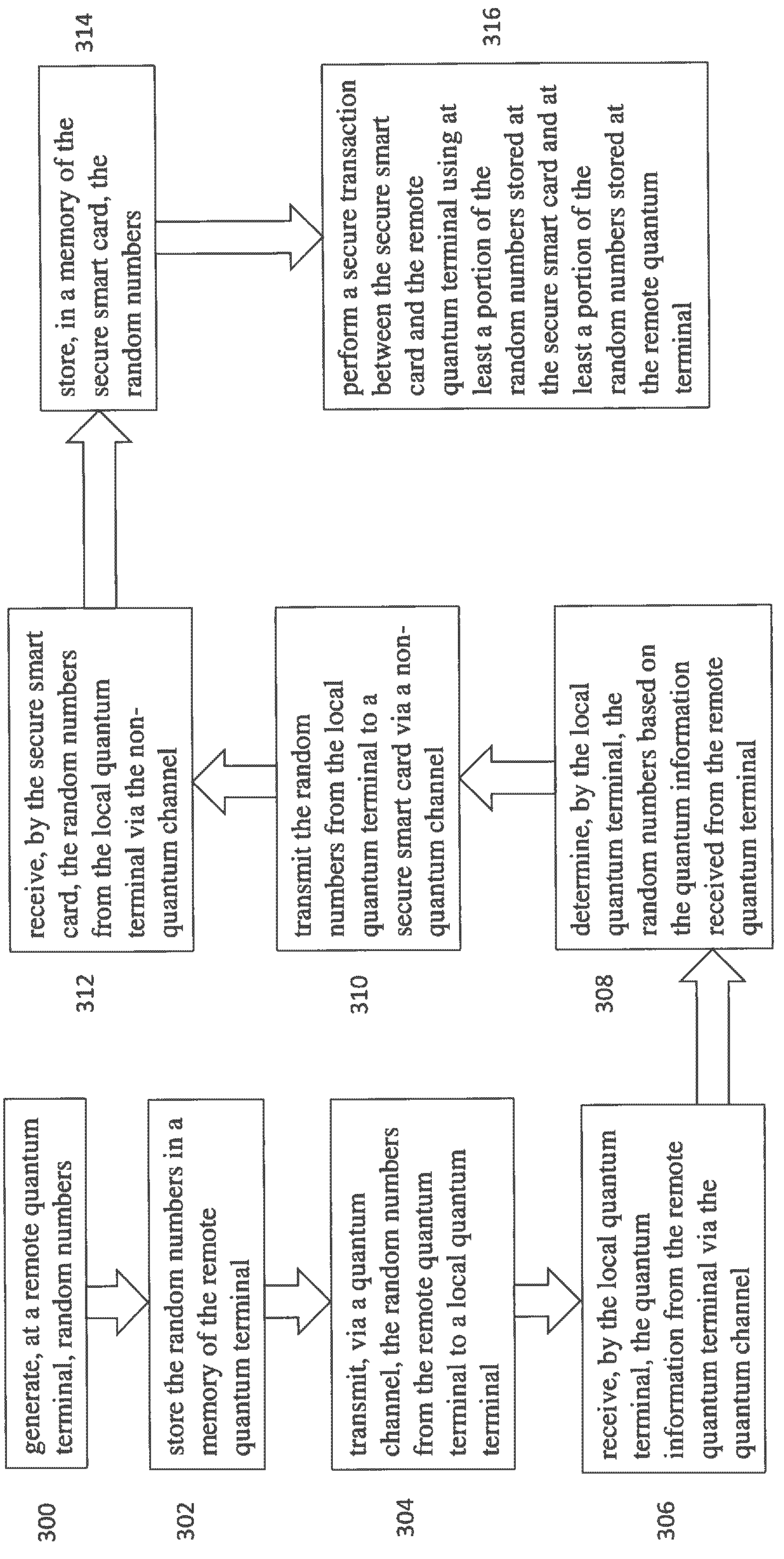
FIG. 3 is a flow chart showing exemplary steps for loading a secure smart card with entropy, which is also stored at a remote server, and using the stored entropy to perform a secure transaction according to an embodiment of the matter described herein.

FIG. 3 is a flow chart showing exemplary steps for loading a secure smart card with entropy, which is also stored at a remote server, and using the stored entropy to perform a secure transaction according to an embodiment of the matter described herein.

At step 300, random numbers are generated at a remote quantum terminal. In one embodiment, generating the random numbers includes using a quantum key distribution (QKD) protocol to produce a shared random secret key which can be used to encrypt and decrypt messages. In another embodiment, generating random numbers includes generating the random numbers based on a quantum physical process such as at least one of: radioactive decay, polarization, or thermal effects of at least one of: a photon and an electron.

At step 302, the random numbers are stored in a memory of the remote quantum terminal.

At step 304, the random numbers are transmitted, via a quantum channel, from the remote quantum terminal to a local quantum terminal, where the quantum channel uses a perfect cipher or a quasi-perfect cipher and a quantum key distribution (QKD) protocol for encoding the random numbers as quantum information. In one embodiment, encoding and communicating the random numbers as quantum information includes using at least one of the following QKD protocols: Bennett-Brassard-84 (BB84), Bennett-92 (B92), and Ekert-91 (E91).

At step 306, the quantum information is received by the local quantum terminal from the remote quantum terminal via the quantum channel. At step 308, the random numbers are determined by the local quantum terminal based on the quantum information received from the remote quantum terminal. For example, the local quantum terminal can measure a quantum property of a quantum particle such as measuring at least one of: radioactive decay, polarization, or thermal effects of particles including, but not limited to, photons and electrons.

At step 310, the random numbers are transmitted from the local quantum terminal to a secure smart card via a non-quantum channel and, at step 312, the random numbers are received by the secure smart card from the local quantum terminal via the non-quantum channel. For example, receiving the random numbers from the local quantum terminal via the non-quantum channel includes using at least one of: a wired connection, a wireless connection, a Wi-Fi connection, an ethernet cable, a near field communication (NFC) protocol, a 4G mobile connection, and a 5G mobile connection.

At step 314, the random numbers are stored in a memory of the secure smart card. In one embodiment, storing the random numbers in a memory includes storing the random numbers as data packets, where each data packet is associated with at least one of: a time stamp, a progressive number, and a unique identifier of the secure smart card.

At step 316, a secure transaction is performed between the secure smart card and the remote quantum terminal using at least a portion of the random numbers stored at the secure smart card and at least a portion of the random numbers stored at the remote quantum terminal, where the at least a portion of the random numbers is used as an encryption key for encrypting the transaction. For example, the at least a portion of the random numbers may be used as a password for communicating between the secure smart card and the remote quantum terminal over a non-quantum channel. When the SSC communicates with RQT over a non-secure (NSC) network, communication is performed using the entropy stored as password k for a perfect cipher or quasi perfect cipher.

In one embodiment, when any or all of the random numbers are used for performing a transaction, the portion of the random numbers used and a remaining portion of the random numbers stored on the secure smart card may be displayed. In a further embodiment, the portion of the random numbers used to perform the secure transaction may be deleted from the memory of the secure smart card and/or the remote quantum server, where it is appreciated that the random numbers stored on the secure smart card may be the same as the random numbers stored at the remote quantum terminal.

Configurations described herein enable a device (e.g., a remote quantum terminal) to exchange quantum cryptographically protected data from numerous local quantum terminals using a quantum channel that uses a perfect cipher or a quasi-perfect cipher and a quantum key distribution protocol for encoding the random numbers as quantum information. Furthermore, each terminal may contain asymmetric or symmetric keys such that the physical compromise of one terminal or channel does not affect other terminals or previous transactions from the compromised terminal. Configurations described herein may employ a random number generator (RNG) including modular arithmetic to derive random keys from a key space such as an Advanced Encryption Standard (AES) 256-bit space. Configurations described herein may also support symmetric algorithms (e.g., the AES algorithm).

As disclosed herein, it is further appreciated that random numbers are used for a variety of purposes, including as input for quantum key distribution (QKD) systems. It may, therefore, be desirable for generated random numbers (e.g., a bitstream) to be unpredictable, where the unpredictability of a bitstream may be quantified by the "entropy" of the stream. Entropy is a fundamental physical quantity, and can be a measure of the lack of determinism in a system. In information theory, the entropy of a stream of messages (sometimes called the "Shannon entropy") is a measure of the average amount of information required to specify each message. A bit stream that exhibits perfect randomness would exhibit one bit of entropy per bit. This condition is referred to as "full entropy." The methods disclosed herein for generating, at a remote quantum terminal, random numbers/bits ensure that the amount of entropy exhibited by the random bits cannot be influenced by an adversary.

In one embodiment, the QKD system described herein having local and remote quantum terminals for communicating securely therebetween may include a controller having an encryption/decryption module connected thereto. Quantum terminals may also include an optical radiation source (e.g., a laser) and a polarization or phase modulator downstream of the optical radiation source and optically coupled thereto.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

generating, at a remote quantum terminal, random numbers;

storing the random numbers in a memory of the remote quantum terminal;

transmitting, via a quantum channel, the random numbers from the remote quantum terminal to a local quantum terminal, wherein the quantum channel uses a perfect cipher or a quasi-perfect cipher and a quantum key distribution (QKD) protocol for encoding the random numbers as quantum information;

receiving, by the local quantum terminal, the quantum information from the remote quantum terminal via the quantum channel;

determining, by the local quantum terminal, the random numbers based on the quantum information received from the remote quantum terminal;

transmitting the random numbers from the local quantum terminal to a secure smart card via a non-quantum channel;

receiving, by the secure smart card, the random numbers from the local quantum terminal via the non-quantum channel;

storing, in a memory of the secure smart card, the random numbers; and performing a secure transaction between the secure smart card and the remote quantum terminal using at least a portion of the random numbers stored at the secure smart card and at least a portion of the random numbers stored at the remote quantum terminal, wherein the at least a portion of the random numbers is used as an encryption key for encrypting the transaction.

2. The method of claim 1, wherein generating random numbers includes producing, using the QKD protocol, a shared random secret key for encrypting and decrypting messages.

3. The method of claim 1, wherein generating random numbers includes generating the random numbers based on a quantum physical process that includes measuring a quantum property of a quantum particle including at least one of: radioactive decay, polarization, or thermal effects.

4. The method of claim 1, wherein storing the random numbers in a memory includes storing the random numbers as data packets, where each data packet is associated with at least one of: a time stamp, a progressive number, and a unique identifier of the secure smart card.

5. The method of claim 1, wherein the at least a portion of the random numbers is used as a password for communicating between the secure smart card and the remote quantum terminal over a non-quantum channel.

6. The method of claim 1, wherein the length of the encryption key is greater than or equal to the length of information encrypted by the encryption key.

7. The method of claim 1, wherein the length of the encryption key less than the length of information encrypted by the encryption key and at least 10 percent of the length of information encrypted by the encryption key.

8. A system comprising:

a remote quantum terminal configured for:

generating random numbers;

storing the random numbers; and transmitting the random numbers to a local quantum terminal via a quantum channel that uses a perfect cipher or a quasi-perfect cipher and a quantum key distribution (QKD) protocol for encoding the random numbers as quantum information;

the local quantum terminal configured for:

receiving the quantum information from the remote quantum terminal via the quantum channel;

determining the random numbers based on the quantum information received from the remote quantum terminal; and transmitting the random numbers to a secure smart card via a non-quantum channel; and the secure smart card configured for:

receiving the random numbers from the local quantum terminal via the non-quantum channel;

storing the random numbers; and performing a secure transaction between the secure smart card and the remote quantum terminal using at least a portion of the random numbers stored at the secure smart card and at least a portion of the random numbers stored at the remote quantum terminal, wherein the at least a portion of the random numbers is used as an encryption key for encrypting the transaction.

9. The system of claim 8, wherein generating random numbers includes producing, using the QKD protocol, a shared random secret key for encrypting and decrypting messages.

10. The system of claim 8, wherein generating random numbers includes generating the random numbers based on a quantum physical process that includes measuring a quantum property of a quantum particle including at least one of: radioactive decay, polarization, or thermal effects.

11. The system of claim 8, wherein storing the random numbers in a memory includes storing the random numbers as data packets, where each data packet is associated with at least one of: a time stamp, a progressive number, and a unique identifier of the secure smart card.

12. The system of claim 8, wherein the at least a portion of the random numbers is used as a password for communicating between the secure smart card and the remote quantum terminal over a non-quantum channel.

13. The system of claim 8, wherein the length of the encryption key is greater than or equal to the length of information encrypted by the encryption key.

14. The system of claim 8, wherein the length of the encryption key less than the length of information encrypted by the encryption key and at least 10 percent of the length of information encrypted by the encryption key.

15. A remote quantum terminal comprising:

a random number generator for generating random numbers, wherein generating random numbers includes using the QKD protocol to produce a shared random secret key which can be used to encrypt and decrypt messages;

a memory for storing the random numbers; and a quantum channel interface for transmitting the random numbers to a local quantum terminal via a quantum channel that uses a perfect cipher or a quasi-perfect cipher and a quantum key distribution (QKD) protocol for encoding the random numbers as quantum information.

16. The remote quantum terminal of claim 15, wherein the random number generator generates the random numbers based on a quantum physical process.

17. The remote quantum terminal of claim 15, wherein the random number generator measures a quantum property of a quantum particle including at least one of: radioactive decay, polarization, or thermal effects.

18. The remote quantum terminal of claim 15, wherein the remote quantum terminal encodes and communicates the random numbers as quantum information using a QKD protocol including at least one of: Bennett-Brassard-84 (BB84), Bennett-92 (B92), and Ekert-91 (E91).

19. The remote quantum terminal of claim 15, wherein the remote quantum terminal stores the random numbers as data packets, where each data packet is associated with at least one of: a time stamp, a progressive number, and a unique identifier of a secure smart card.

20. The remote quantum terminal of claim 15, wherein the remote quantum terminal uses at least a portion of the random numbers as an encryption key for performing a secure transaction between the remote quantum terminal and a secure smart card using at least a portion of the random numbers stored at the secure smart card and at least a portion of the random numbers stored at the remote quantum terminal, wherein the length of the encryption key is greater than or equal to the length of information encrypted by the encryption key.

21. The remote quantum terminal of claim 15, wherein the remote quantum terminal uses at least a portion of the random numbers as an encryption key for performing a secure transaction between the remote quantum terminal and a secure smart card using at least a portion of the random numbers stored at the secure smart card and at least a portion of the random numbers stored at the remote quantum terminal, wherein the length of the encryption key less than the length of information encrypted by the encryption key and at least 10 percent of the length of information encrypted by the encryption key.

22. A local quantum terminal comprising:

a quantum channel interface for receiving quantum information from the remote quantum terminal via the quantum channel;

a processor for determining random numbers based on the quantum information received from the remote quantum terminal; and a non-quantum channel interface for transmitting the random numbers to a secure smart card via a non-quantum channel.

23. The local quantum terminal of claim 22, wherein the local quantum terminal uses at least a portion of the random numbers as a password for communicating with a secure smart card over a non-quantum channel.

24. The local quantum terminal of claim 23, wherein the local quantum terminal transmits the random numbers to the secure smart card via at least one of: a wired connection, a wireless connection, a Wi-Fi connection, an ethernet cable, a near field communication (NFC) protocol, a 4G mobile connection, and a 5G mobile connection.

25. The local quantum terminal of claim 22, wherein the random numbers determined by the local quantum terminal are the same as the random numbers stored on a secure smart card.

26. A secure smart card comprising:

a non-quantum channel interface for receiving random numbers from a local quantum terminal via a non-quantum channel, wherein the random numbers are also stored in a memory of a remote quantum terminal;

a memory for storing the random numbers; and a processor for performing a secure transaction between the secure smart card and the remote quantum terminal using at least a portion of the random numbers stored at the secure smart card and at least a portion of the random numbers stored at the remote quantum terminal, wherein the portion of the random numbers is used as an encryption key for encrypting the transaction.

27. The secure smart card of claim 26, further comprising a display for displaying the portion of the random numbers used to perform the secure transaction and a remaining portion of the random numbers stored on the secure smart card.

28. The secure smart card of claim 26, wherein the secure smart card deletes the portion of the random numbers used to perform the secure transaction from the memory of the secure smart card.

* * * * *